Feb. 4, 1930. W. F. HEROLD 1,745,992
CASTER
Filed April 21, 1927
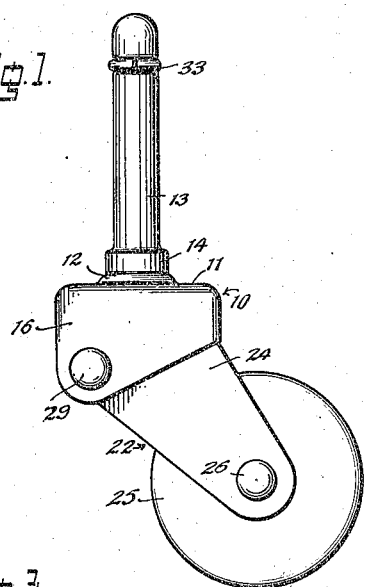
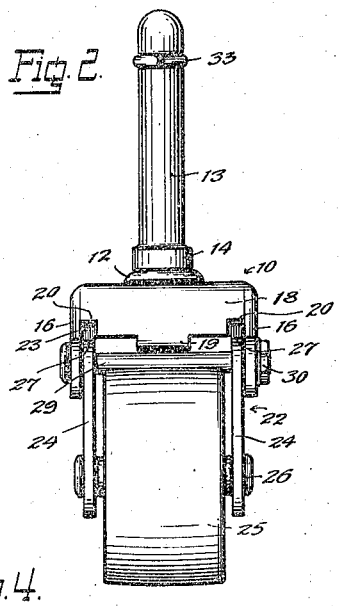
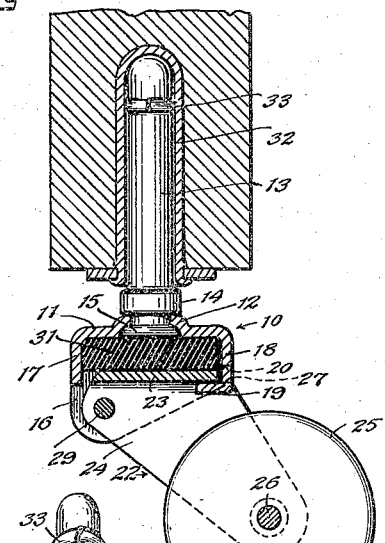
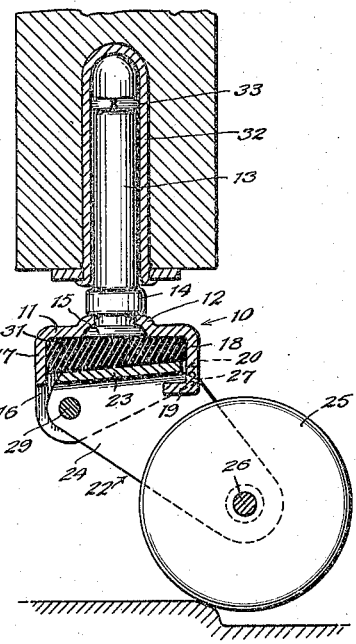
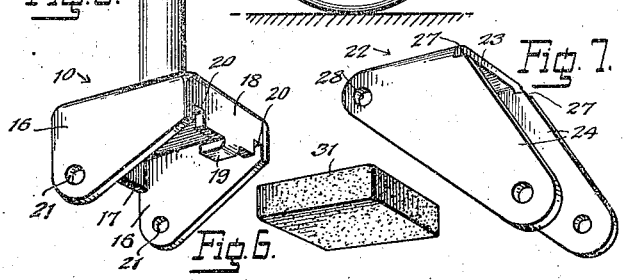
INVENTOR.
WALTER F. HEROLD.
BY
ATTORNEY.

Patented Feb. 4, 1930

1,745,992

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed April 21, 1927. Serial No. 185,512.

The present invention relates to improvements in casters, an object being to provide a resilient shock absorbing and compensating caster of simple and inexpensive construction, and efficient and reliable in operation.

A particular object is to provide a swivel caster of this character having a pintle and in which the resilient means is so arranged as to primarily receive and dissipate the force and strain of shocks or excessive vibration upon the caster wheel before transmission of such shocks or vibrations to the pintle, to the end that the pintle is protected against bending or breaking strains even under the most severe conditions of use.

Another object is to provide such a caster which will compensate for irregularities or unevenness in the floor, so that the furniture will be firmly engaged with the floor at its several points of support.

It is also an object to provide resilient shock absorbing means occupying a relatively extensive lateral area in a plane at right angles to the axis of the pintle, and in which the force of shocks upon the caster wheel is widely distributed over such area.

It is also proposed to so support the caster wheel with respect to the pintle and the resilient shock absorbing means that in the normal tracking position of the caster the force of any impact against the wheel will be directly transmitted to the resilient means while the rigid points of support will be out of the path of such force.

Another object is to provide a structure in which the shock absorbing means is incorporated in the caster horn, and in which the usual pintle and socket assembly may be employed.

A still further object is to provide shock absorbing means in the form of a rubber or other resilient block completely confined at its outer surfaces so that when the elastic limit is reached the rubber will support the load, irrespective of its weight, and deterioration in structure and elasticity will be negligible.

The caster according to the invention is particularly adapted for use upon furniture or apparatus subject to vibrations, as washing machines, sewing machines, refrigerator machines and the like; and upon furniture or apparatus adapted to be moved about and where it is desired to relieve the same of any shocks due to running over obstructions or sudden dropping, as in running off curbs or the like; and where it is desired to provide both a shock absorbing and a substantially noiseless caster, as for instance in hospital use.

With the above and other objects in view an embodiment of the invention is shown in the accompanying drawings and this embodiment will be hereinafter more fully described with reference thereto and the invention will be finally pointed out in the claims.

In the drawings:—

Fig. 1 is a side elevation of a caster according to the present embodiment of the invention.

Fig. 2 is a front elevation thereof.

Fig. 3 is a vertical sectional view showing the caster pintle engaged in a socket, showing the relation of the resilient means when there is no load or shock imposed thereon.

Fig. 4 is a similar view showing the parts in the deflected position as when running against an obstruction.

Fig. 5 is a perspective view of the upper member of the horn.

Fig. 6 is a perspective view of the shock-absorbing and compensating means employed.

Fig. 7 is a perspective view of the lower member of the horn.

Similar reference characters indicate corresponding parts throughout the several figures of the drawings.

Referring to the drawings, the caster, according to the present embodiment of the invention, comprises a horn consisting of an upper member 10 having a transverse top 11 of substantially rectangular outline and provided with a central upwardly pressed apertured portion 12 in which the lower end of the pintle 13 is rigidly secured, the pintle being provided with a shouldered enlargement 14 engaging the upper side of the portion 12 and a stud end 15 engaged in the aperture and secured by spreading or heading over within the under recessed side of the portion 12, so that the lower end surface of the pintle is substantially flush with the under surface of the top portion 11. The member 10 is further provided with side ears or flanges 16, 16 bent downwardly from the top portion 11, a closure flange 17 bent downwardly from the forward edge of said portion, and a closure flange 18 bent downwardly from the rearward edge of said top portion and provided at its lower edge with an inwardly bent lug 19. Recesses 20, 20 are provided in the lower edge of the flange 18 adjacent the flanges 16, 16, and constitute movement limiting means for the movable wheel carrying member of the horn, presently to be more fully referred to. The side flanges 16, 16 extend below the flange 17, their lower edges being inclined upwardly to the rearward flange 18, and are provided with aligned hinge bearing holes 21, 21 disposed forwardly to the central plane of the pintle axis. The flanged structure of the upper member constitutes a closed box formation.

The wheel carrying horn member 22 is adapted to be hingedly connected to the upper member 10, and comprises a transverse top portion 23 and side portions 24, 24 between which the caster wheel 25 is rotatably supported upon an axle 26, the axis of the caster wheel being rearwardly offset with respect to the central plane of the pintle axis. The rearward edges of the side portions 24, 24 are provided adjacent the top portion 23 with abutment shoulders 27 for engagement in the recesses 20. Aligned holes 28, 28 are provided in the side portions 24, 24, and a headed hinge-pin 29 is engaged through these holes and through the holes 21, 21 of the upper member 10, this pin being preferably removable and provided for this purpose with a nut 30 screwed upon one end.

In the assembled relation the top transverse portion 23 of the hinged lower member is engaged at its rearward edge above the lug 19 and in its normal position is substantially parallel to the upper transverse top portion of the member 10, and the shock-absorbing and compensating means, in the form of a resilient block 31 of rubber or the like, is interposed between said parallel transverse portions and is totally confined against lateral displacement by the box-like structure formed by the flanges of the upper member. The total confinement of the rubber prevents its expansion from its inert condition, and its elasticity and structure is therefore preserved almost indefinitely.

The caster may be attached in any suitable way to provide a swivel mounting, and in the present disclosure I have shown a socket 32 adapted to be secured in a hole drilled in the furniture leg, and within which socket the pintle is swivelly engaged and retained by a friction ring 33 loosely disposed in an annular groove in the pintle and adapted to grip the inner surface of the socket. It will be understood, of course, that other pintle and socket constructions may be employed, and other means provided to obtain a swivel mounting for the caster, and that the mounting means may be adapted for attachment to various kinds of furniture, that is, angle iron legs, tubular metal legs, etc.

In the normal use of the caster the load strain between the pintle and the wheel is directly upon the rubber cushion which is disposed in lateral relation beneath the lower end of the pintle and provides a relatively wide area over which the strain is distributed. The weight of the furniture causes a slight deflection of the cushion, so that the furniture is resiliently supported and any shocks or vibrations generated from within the furniture, as by a motor carried thereby, or generated in the floor, are absorbed. Also any irregularities or unevenness in the floor are compensated for so that the furniture will be firmly engaged with the floor at its several points of support. The shoulders 27 and recesses 20 provide a solid support after a predetermined deflection, so that the rubber block is relieved of pressure beyond its calculated elastic limit. Inasmuch as the compensating means is carried entirely within the horn, there is no impairment of the free swivelling action of the caster. It is a further advantage that strain of shocks imposed upon the caster wheel are dissipated within the compensating cushion so that the pintle is relieved of the strain of such shocks, and any possibility of bending or breaking is prevented, and particularly the unsupported portion of the pintle between the socket and the horn is relieved of excessive strain. During movement of the furniture the caster tracks as shown in Figs. 3 and 4 with the pivotal axis of the lower member of the horn forwardly of the central axis of the pintle and with the wheel axis rearwardly thereof, so that in encountering an obstruction the deflection is directly opposed to the compensating cushion, and over a relatively wide area symmetrically disposed about the axis of the pintle. The shock caused by the resistance of such obstruction is substantially absorbed within the cushion, and the rigid parts of the caster are relieved of strain, the movement of the lower member of the horn being in a clockwise direction about the hinge-pin.

The structure permits the cushion member being conveniently renewed when desired by merely removing the hinge-pin and substituting a new cushion member.

It will be understood that for certain types of use the upper portion of the horn may be substantially wider in proportion than the embodiment illustrated and that the cushion member may be proportioned to suit different conditions, and in certain cases may be relatively soft, while in others it may be only slightly resilient. Also, the cushion may be made porous, or be provided with openings or grooves to obtain desired degree of elasticity.

I have illustrated and described a preferred and satisfactory embodiment of the invention but it will be obvious that changes may be made therein within the spirit and scope thereof, as defined in the appended claims.

Having thus described my invention, what I claim and desire to secure by Letters Patent is:—

1. In a caster, a wheel carrying horn comprising a top portion, a wheel carrying portion pivotally connected to said top portion upon a horizontal axis, and horizontally disposed resilient means interposed between said top portion and said wheel carrying portion.

2. In a caster, a wheel carrying horn comprising a top portion, a wheel carrying portion pivotally connected to said top portion along a horizontal axis, and including a transverse upper portion disposed in spaced and substantially parallel relation to said top portion, and a resilient block member interposed in the space between said top and wheel carrying portions.

3. In a caster, a wheel carrying horn, swivel mounting means for said horn, said horn comprising a top portion adapted to have swivel movement about its vertical axis, and a wheel carrying portion pivotally connected to said top portion along a horizontal axis disposed at one side of the vertical swivel axis, a wheel carried by said wheel carrying portion having its axis disposed at the other side of said swivel axis, and resilient means interposed between said top portion and said wheel carrying portion.

4. In a caster, a wheel carrying horn, swivel mounting means for said horn, said horn comprising a top portion adapted to have swivel movement about its vertical axis, and a wheel carrying portion pivotally connected to said top portion along a horizontal axis disposed at one side of the vertical swivel axis, a wheel carried by said wheel carrying portion having its axis disposed at the other side of said swivel axis, and a horizontal resilient block member interposed between said top portion and said wheel carrying portion.

5. In a caster, a wheel carrying horn, a vertical pintle, said horn comprising a top portion rigidly secured to said pintle, and a wheel carrying portion pivotally connected to said top portion along a horizontal axis disposed at one side of the vertical swivel axis, and a horizontally disposed resilient block member interposed between said top portion and said wheel carrying portion and disposed directly beneath said pintle.

6. In a caster, a wheel carrying horn comprising a top portion, a wheel carrying portion pivotally connected to said top portion along a horizontal axis and including a transverse upper portion disposed in spaced and substantially parallel relation to said top portion, and a relatively wide flat horizontally disposed resilient block member interposed in the space between said top portion and said wheel carrying portion.

Signed at Bridgeport, county of Fairfield, and State of Connecticut this 23rd day of March, 1927.

WALTER F. HEROLD.